(12) United States Patent
Traylor

(10) Patent No.: US 6,856,883 B2
(45) Date of Patent: Feb. 15, 2005

(54) SOLID-STATE ACCELEROMETER MODULE AND SYSTEM THEREFOR

(76) Inventor: Chadwick Ray Traylor, 1640 E. Carla Vista Drive, Chandler, AZ (US) 85225

(*) Notice: Subject to any disclaimer, the term of this patent is extended or adjusted under 35 U.S.C. 154(b) by 170 days.

(21) Appl. No.: 10/372,477

(22) Filed: Feb. 21, 2003

(65) Prior Publication Data

US 2003/0171890 A1 Sep. 11, 2003

Related U.S. Application Data

(60) Provisional application No. 60/362,043, filed on Mar. 6, 2002.

(51) Int. Cl.[7] .............................. B60Q 1/50; G08G 1/16; F21V 21/00
(52) U.S. Cl. ............................ 701/70; 340/463; 73/1.38
(58) Field of Search ........................ 701/70; 340/425.5, 340/463, 464, 467, 468, 479, 466, 471, 903, 441, 472, 436; 307/10.1, 10.8; 73/1.38

(56) References Cited

U.S. PATENT DOCUMENTS

| | | | | |
|---|---|---|---|---|
| 5,440,913 A | * | 8/1995 | Crispin et al. ............... 73/1 D |
| 6,020,814 A | * | 2/2000 | Robert ........................ 340/467 |
| 6,133,852 A | * | 10/2000 | Tonkin ........................ 340/903 |
| 6,411,204 B1 | * | 6/2002 | Bloomfield et al. ........ 340/467 |
| 6,525,652 B2 | * | 2/2003 | Smith ....................... 340/425.5 |
| 2003/0063477 A1 | * | 4/2003 | Stepanenko et al. ........ 362/546 |

* cited by examiner

Primary Examiner—Tan Q. Nguyen
Assistant Examiner—Dalena Tran
(74) Attorney, Agent, or Firm—Russel C. Wells

(57) ABSTRACT

A solid-state accelerometer module adapted to control the operation of the taillights in a motor vehicle for warning the driver of the trailing motor vehicle of a deceleration of the lead vehicle. A retrofit tail lamp contains the solid-state accelerometer module within its housing and by means of at least two separate lamp filaments, the tail lamp can replace the original tail lamp. A motor vehicle may have a receiving antenna and a transmitting antenna electrically connected to a receiver and a transmitter respectively located in the module. The transmitting-receiving system may be located on two different vehicles so that the following vehicle is quickly notified of the deceleration of the lead vehicle.

5 Claims, 3 Drawing Sheets

SOLID-STATE ACCELEROMETER MODULE AND SYSTEM THEREFOR

CROSS REFERENCE TO RELATED APPLICATION

This application is related to co-pending patent application claiming the benefit of serial No. 60/362,043 entitled "Solid-state Accelerometer Warning System" filed on Mar. 6, 2002 by Chadwick Ray Traylor.

FIELD OF THE INVENTION

This invention relates to accelerometers in general and more particularly to an accelerometer module as may be used in the brake light system of a motor vehicle or a braking/deceleration/acceleration warning system for any moving body.

BACKGROUND OF THE INVENTION

At the present time, several accidents, more particularly rear end accidents with motor vehicles are caused because the striking or following vehicle following the struck or lead vehicle did not have sufficient warning that the lead vehicle was decelerating or slowing down. If the driver of the striking vehicle had sufficient warning, the driver might have taken successful evasive maneuvers to avoid the accident.

Many times the driver of the following vehicle may not appreciate the rate of deceleration of the lead vehicle. Action to be taken by the driver of the following vehicle depends in a large measure in response to the deceleration of the lead vehicle. If the lead vehicle is slowing down at a very slow deceleration rate and the driver of the following vehicle "slams" on his brakes, the end result may be that the vehicle following him strikes his vehicle.

SUMMARY OF THE INVENTION

The purpose of the preferred embodiment and all other embodiments to be described herein is to provide a brake light warning system to a following or trailing vehicle or moving body, when the lead vehicle, or moving body, is being decelerated. The intensity and the operational characteristic, speed of flashing, of the lead vehicle's brake lights will indicate to the trailing vehicle's driver the relative speed of deceleration from slow to very rapid. A very rapid deceleration might occur when the lead vehicle is being hard braked in an attempt to avoid an accident. A slow deceleration might occur when the lead vehicle is approaching a traffic light during normal driving conditions. The system is so designed to control its response to decelerations above a predetermined level thereby not responding to each and every deceleration of the lead vehicle, but only the decelerations that could lead to a "panic" or more rapid than normal type stop.

As will be shown, the accelerometers in the system are responsive to single axis forces and will be capable of outputting a signal indicating a deceleration above a predetermined level. Such signals may well occur during side acceleration or deceleration as may happen when a motor vehicle is struck on its side such a "T-bone" crashes or when a vehicle is responding to road conditions that are less than ideal such as sliding on ice.

The above advantages and objectives are found in the solid-state accelerometer module for use in a motor vehicle having a power supply with an light illumination voltage level, the module has at least one accelerometer aligned along one axis of the motor vehicle and responding to the variable speed of the motor vehicle to generate a first variable frequency accelerometer voltage signal representing the deceleration rate along said one axis.

A microprocessor is located in the module having a memory for storing an algorithm, a calculation means and an electrical signal voltage threshold means having a designed voltage value representing a predetermined deceleration rate. The algorithm stored in the memory and controls the operation of the microprocessor in response to the first accelerometer signal and the voltage threshold means.

A calculation means is located in the microprocessor and responds to the algorithm for generating a first variable frequency illumination voltage level control signal representing the deceleration rate of the motor vehicle.

The solid-state accelerometer module may be designed to respond to the acceleration rate of the motor vehicle and the voltage threshold means to generate a predetermined acceleration level for the motor vehicle.

These and other objects and advantages will be found in the following drawings and detailed description.

DETAILED DESCRIPTION OF THE PREFERRED EMBODIMENT

Figure 1:
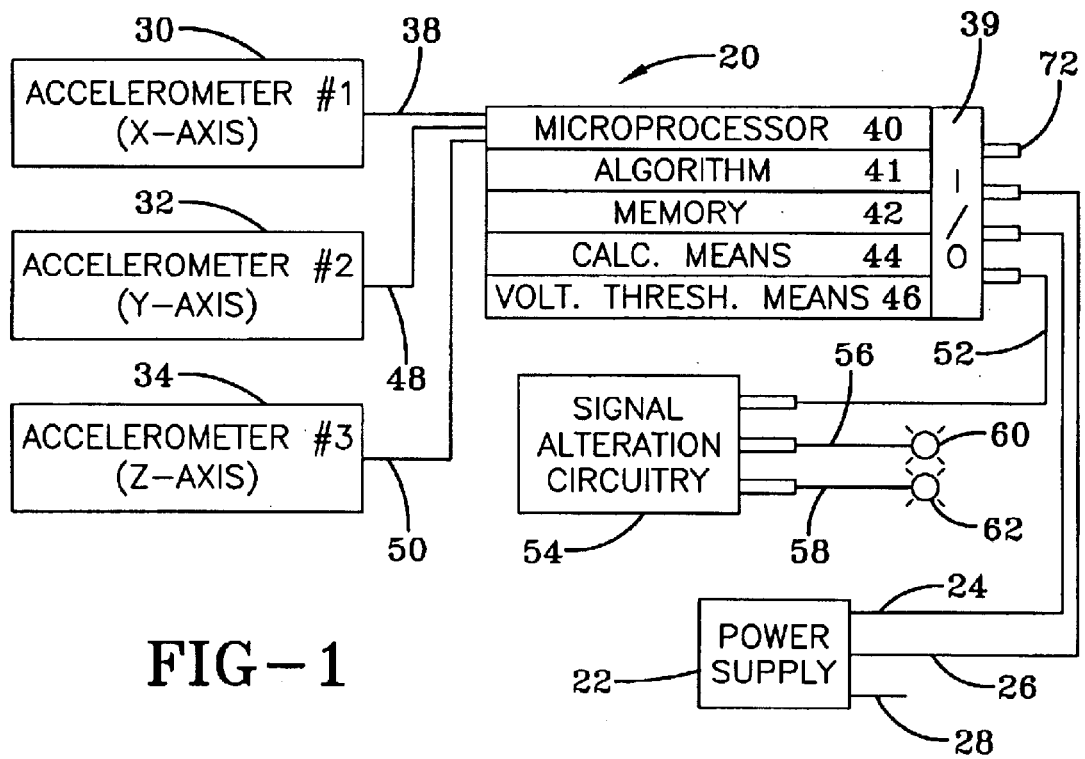
FIG. 1 is a block diagrammatic schematic of a solid-state accelerator module.

Referring to the Figs by the characters of reference, FIG. 1 is a block diagrammatic schematic of a solid-state accelerometer warning system module 20, SSAWC, in the form of a chip that is the main component of the brake system. It is to be understood, that while the preferred embodiments are dealing with the rate of deceleration; the rate of acceleration is equally applicable.

The preferred embodiment of the solid-state accelerometer module 20 illustrated in FIG. 1, is for use in a motor vehicle having a power supply 22 with one or more outputs 24, 26 including a light illumination voltage level 28. The module 20 may well be constructed as an integrated circuit chip. While there are illustrated three accelerometers 30, 32, 34, the module requires at least one accelerometer 30 aligned along one axis of the motor vehicle 36. The accelerometer 30 responds to the variable speed of the motor vehicle 36 to generate a first variable frequency accelerometer voltage signal 38 representing the deceleration rate along the one axis. The output of the accelerometer is an accelerometer signal which may be a voltage signal, a current signal, or any form of an acceleration signal. Likewise, in the descriptions that follow, while couched in terms of a voltage, the characteristic of the signal may be a current signal, a digital signal or any other characteristic that is available.

Each of the other accelerometers 32, 34 responds respectively to the deceleration rate of the motor vehicle 36 along one of the other axes.

A microprocessor 40 with an I/O circuitry, 39 has a memory 42 storing an algorithm 41, a calculation means 44 and a signal or voltage threshold means 46 having a designed voltage value representing a predetermined deceleration rate. Such a value is set in the calculation means 44 for each axis by the vehicle designer and corresponds to the characteristics of the particular motor vehicle 36. The algorithm 41 controls the operation of the microprocessor 40 in response to the first accelerometer signal 38 and the voltage threshold means 46. If there are other accelerometers 32, 34 in the module 20, the algorithm 41 responds to the presence of each accelerometer signal 48, 50 and each voltage threshold means 46 to operate on a brake illumination control system in the vehicle's braking system. The calculation means 44 including the voltage threshold means 46 has a designed value representing a predetermined deceleration rate. This rate is the minimum rate that the overall system responds to. The algorithm 41 determines the level of deceleration and compares that level against a predetermined level set into the system 20 by the system designer. In one embodiment the microprocessor 40 is a Parallax BS1 micro-controller from Parallax; the accelerometers 30, 32, 34 are AD XL202AE from Analog Devices; a voltage regulator in the power supply is an National LM78LXX, 5 volt 100 ma; and in the signal alteration circuitry 54 there are the output transistor is a IRF 510 1A NMOS, and an OpAmp is an NTE 928M single supply op amp both from National Semiconductors.

Figure 2:
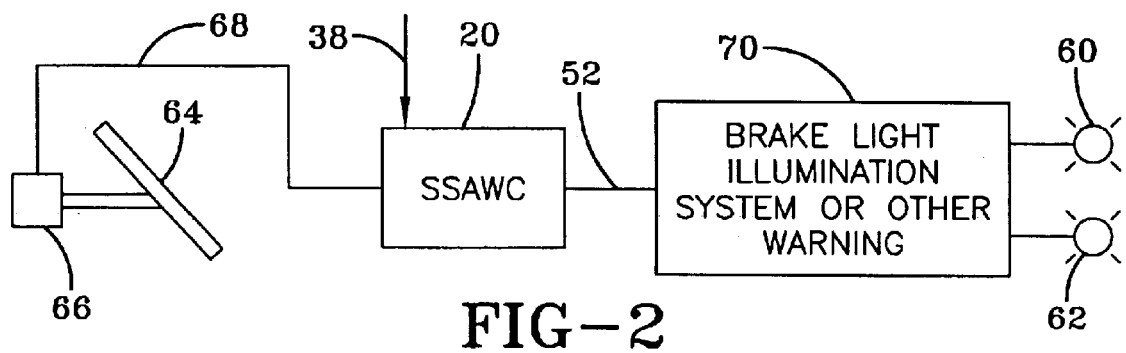
FIG. 2 is a system schematic of the module of FIG. 1 in a motor vehicle embodiment.

The present embodiment is operatively connected in parallel which the vehicle's normal brake control system so as to not modify or interrupt the integrity of the normal brake control system. One of the outputs 48 of the module 20 of FIG. 1 is an electrical signal that operates on the brake lights 60, 62 through the signal alteration circuitry 54. The output signals 56, 58 from the signal alteration circuitry 54 operate on the brake lights 60, 62. This is illustrated in FIG. 2. This electrical signal travels through a straight low resistance passive path to the brake lamp filament and/or other type light source in order that normal brake light or brake illumination operation remains in tact even if SSAWC system fails.

The solid-state accelerometer module 20 is electrically connected in circuit with a vehicle brake actuation initiation device 64. The initiation device 64 is responsive to a vehicle operator desiring to reduce the speed of his/her motor vehicle. The initiation device 64 is normally a brake pedal actuating a switch 66 to initiate an electrical signal 68.

The vehicle normally has a power supply 22 for generating a plurality of voltage levels including a ground level and an illumination level 28 for operating the various lights in the vehicle including the brake lights 60, 62. The brake lights are in a brake illumination control system 70 that in the preferred embodiment responds to the first variable frequency illumination voltage level control signal 38. A subsystem of the brake illumination control system is a brake illumination system having at least one brake light 60, 62 that are responsive to the control signal 38 to illuminate the brake lights. The original brake light signal degradation does not occur.

The switch 66 is actuated in response to the movement of the brake pedal 64. When the driver of the vehicle operates the brake pedal or any other brake initiation device such as a hand brake, the switch 66 is actuated to send an electric signal 68 to the solid-state acceleration module 20. This signal is processed according to the algorithm 41 and a power signal 28 is supplied to the brake lights 60, 62 causing a pulsing of the brake light. As illustrated in FIG. 1, the algorithm 41 responds to the several inputs from the accelerometers 30, 32, 34 and the engine control signals 72 such as engine speed, fuel control signal, transmission control, etc. to determine the harshness of the braking action. The brake lights will pulse more rapidly on a "panic" stop than it will on a normal slowing down.

Figure 3:
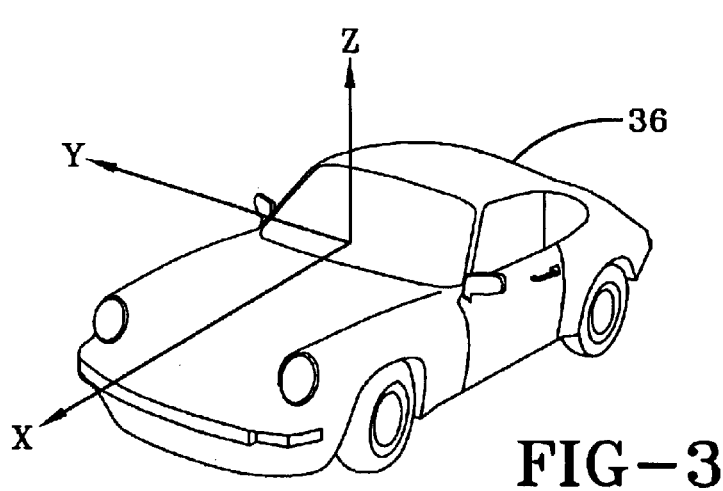
FIG. 3 is a top diagrammatic view of a motor vehicle illustrating the x-y acceleration coordinates.

Referring to FIG. 3 there is illustrated the orientation of the motor vehicle 36 as respects the solid-state accelerometer module 20. The x-axis is along the normal longitudinal axis of the vehicle and the y-axis is orthogonal thereto. In this way the calculated acceleration vector will take into account and movement of the vehicle 36 including straight and swerving for any reason such as driver controlled or as a result of a side impact or "T-bone" impact.

Figure 4:
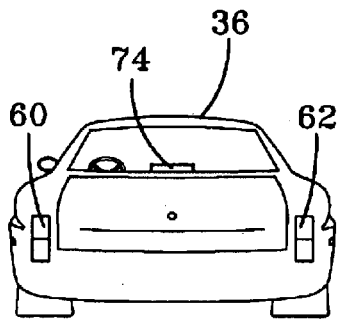
FIG. 4 is a rear view of the motor vehicle of FIG. 4 showing the location of various brake lights.

FIG. 4 is a rear view of a "normal" motor vehicle 36 illustrating the several locations for brake light assemblies. One location is with each taillight 60, 62. Another brake light 74 location is mounted high up on the vehicle such as inside the rear window, i.e., a typical third brake light.

Figure 5:
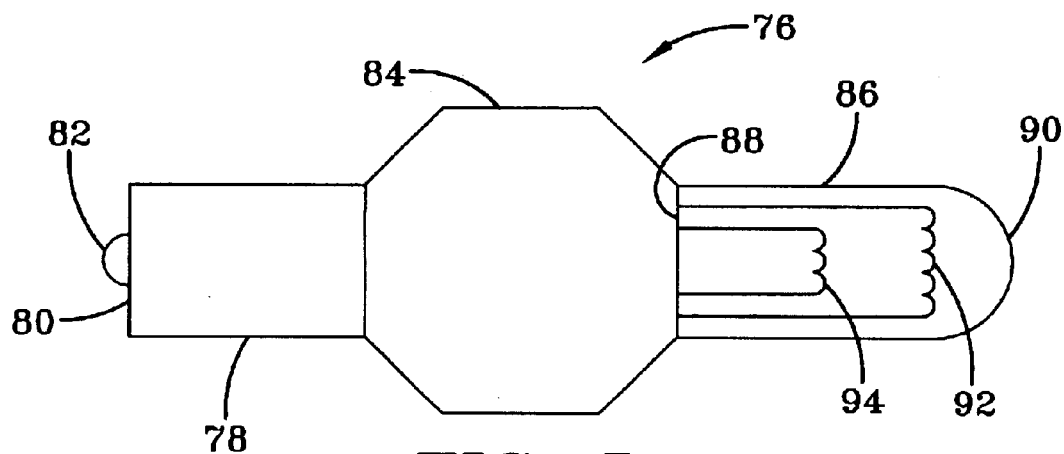
FIG. 5 is a brake-light assembly incorporating the module.

Referring to FIG. 5 that is a plan view of a brake light bulb 76 as may be use as a retrofit as well as may be used as an original part of the motor vehicle 36. This FIG. 5 illustrates a first hollow cylindrical body member 78 enclosed at one end 80. The enclosed end 80 of the first body member 78 is adapted to be inserted into a bulb socket in the brake system of a motor vehicle 36. The first body member 78 has a terminal 82 adapted to receive a voltage control signal that is generated by a vehicle brake actuation initiation device. The voltage control signal has a magnitude equal the illumination voltage level 28 of the vehicle power supply 22.

A second hollow cylindrical body member 84 is connected to the first cylindrical body 78. This second cylindrical body member 84 has a diameter different than the diameter of the first cylindrical body 78 for enclosing the module 20. Typically the diameter of the second body member 84 is greater than the diameter of the first body member 78.

A third hollow cylindrical body 86 enclosed at one end 88 is connected to the second cylindrical body 84. Typically the third cylindrical body 86 is transparent and usually fabricated from glass or a similar material. The glass end 88 is open at the end adjacent to the second body and closed at the opposite end 90.

The first and second hollow cylindrical body members 78, 84 may be extruded or drawn to be an unitary structure wherein the outside surfaces are blended together. Regardless of how the first, second and third hollow cylindrical bodies are individually manufactured, the end result as illustrated in FIG. 5 is a unitary structure.

Located in the third body 86 are at least two lamp filaments 92, 94 or light sources that are mounted coaxially. At least one of the filaments, typically 94, is electrically connected for varying the intensity of the filament 94 according to the first variable frequency illumination voltage level control signal. The other of the filaments 92 is electrically connected to receive the control signal having a magnitude equal to the illumination voltage level 28 of the power supply 22. This control signal bypasses the module 20 to supply the normal illumination found in brake light circuits. Either or both filaments may be multiple filaments.

Depending upon the algorithm 41 and the system designer, the variable frequency illumination voltage level can also control the flashing of the filament to which it is electrically connected in circuit.

If the light bulb 76 of FIG. 5 is used in a modification or retrofit of a vehicle, the electrical system of the vehicle is not changed as the original brake light is removed from its socket and the new modified brake light 76 is inserted. The base of the bulb 82 is a standard configuration that will be capable of being inserted into the brake lamp socket. Power to the module 20 is via the power to the lamp, hence when the brake light is not powered up; there is no power to the module. If the accelerometer module 20 should fail, the normal brake lights will not be affected as the fail-safe mode for the SSAWC module 20 is off.

Sometimes the driver of the vehicle by either downshifting or up-shifting at a very fast pace can cause an acceleration output signal 52 to be generated by the module 20. In the case of a quick downshift from gear number five to gear number two, the magnitude of the deceleration is such that the trailing driver should be made aware. In this case, the driver of the lead vehicle may not actuate the brake pedal 64 causing power to be delivered to the brake lights 60, 62. An auxiliary power supply is then needed to supply power to the brake lights. Such an auxiliary supply may be a controlled power signal from the main supply 22 that is only active when there is a sudden deceleration or in some case an acceleration that is determined by the accelerometers 30, 32, 34 and a signal indicating the brake pedal 64 has not been actuated. This auxiliary power supply signal is supplied to the module 20 in parallel with the main power supply. Logic in the microprocessor 40 actuated by the algorithm 41 controls the exclusion of the auxiliary power when the main power is present. Thus, the rapid deceleration caused by means other than the actuation of the brakes will activate the SSAWC 20 and flash the brake lights 60, 62.

Figure 6:
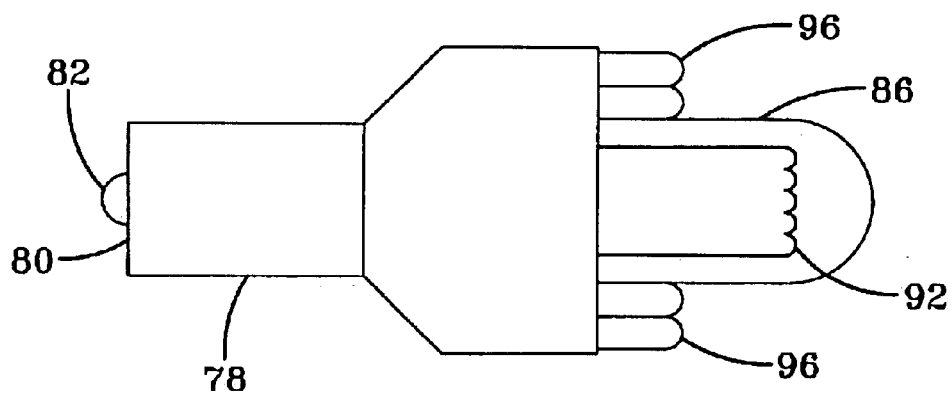
FIG. 6 is another embodiment of the brake-light assembly of FIG. 3.
Figure 7:
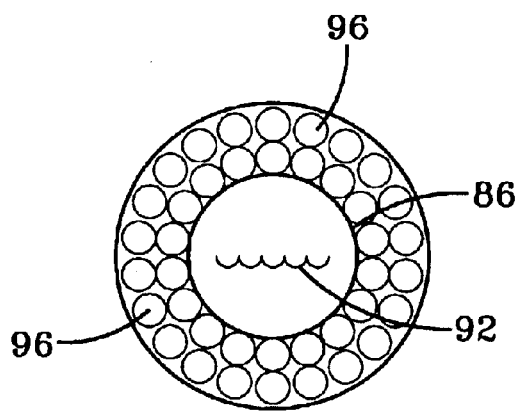
FIG. 7 is an end view of FIG. 6.
Figure 8:
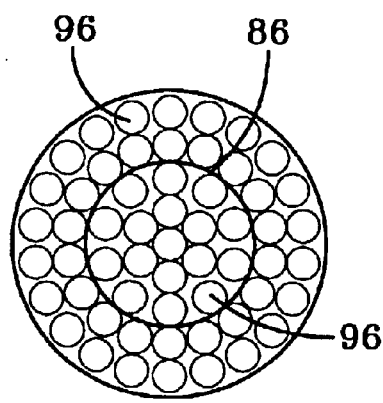
FIG. 8 is the end view of another embodiment of FIG. 6.

FIGS. 6–8 are views of another embodiment of a taillight bulb. In FIG. 6, the third cylindrical body 86 encloses the normal brake lamp filament 92 while surrounding the third cylindrical body are a plurality of auxiliary lamps 96. In particular these lamps may well be LEDs that are powered from the solid-state accelerometer chip or module 20. FIG. 6 shows the LEDs surrounding the third cylindrical body 86 while in FIG. 8 the third cylindrical body 86 and its enclosed filaments 92, 94 are replaced by LEDs 96 having the required brightness and are powered by the normal brake-light circuit. One advantage of using LEDs is that individually they consume less power, a longer operational life and have a faster response than normal lamp filaments.

Figure 10:
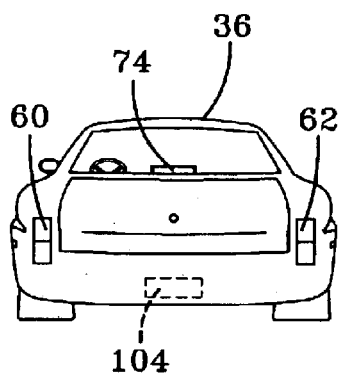
FIG. 10 is a rear view of the motor vehicle of FIG. 9.
Figure 12:
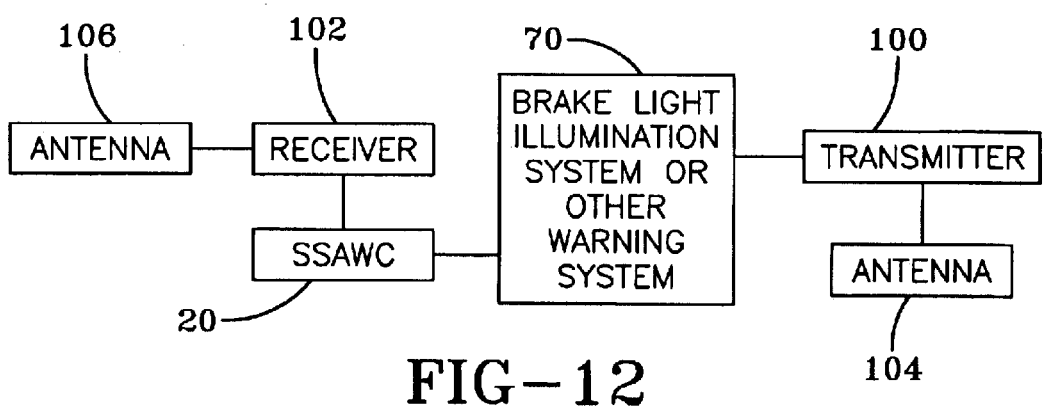
FIG. 12 is a system schematic of the system incorporating the module as found in the motor vehicle of FIG. 9.

A modification of the schematic of FIG. 1 would be to add both a transmitter 100 and a receiver 102, as illustrated in FIG. 12. The transmitter 100 is mounted in the module of the lead vehicle for transmitting the signals from the microprocessor indicating the change in acceleration or deceleration. These signals would be transmitted through an antenna, or an optical source, 104 mounted on the rear or any positioning such as side view mirrors, that allows the trailing vehicle to see, electrically or optically or any by other communication means, the antenna of the lead vehicle as shown in FIG. 10. Typically this is a directional antenna 104 in that it is aligned to be directed rearward of the lead vehicle. Depending upon the power of the transmitted signal and direction of transmission, a design decision can be made to limit the signal to only the in-line trailing vehicle or also to include vehicles on either side of the in-line trailing vehicle.

Figure 11:
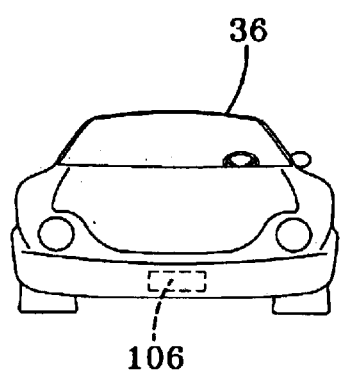
FIG. 11 is a front view of the motor vehicle of FIG. 9.

A receiving antenna 106, or optical source, mounted in the front end of the trailing vehicle or vehicles, then receives the transmitted signals. The receiving antenna 106 may be mounted in the grill area or any frontal area of the trailing vehicle as shown in FIG. 11. The antenna 106 is electrically connected to a receiver 102 mounted in the module 20 and inputted into its microprocessor causing the warning system to operate based on the action of the lead vehicle, which is at least two cars away. Therefore in a multi-vehicle situation wherein the lead car suddenly decelerates and generates a warning signal, the trailing cars will each receive and transmit the warning signal to each of the vehicles trailing it.

Figure 9:
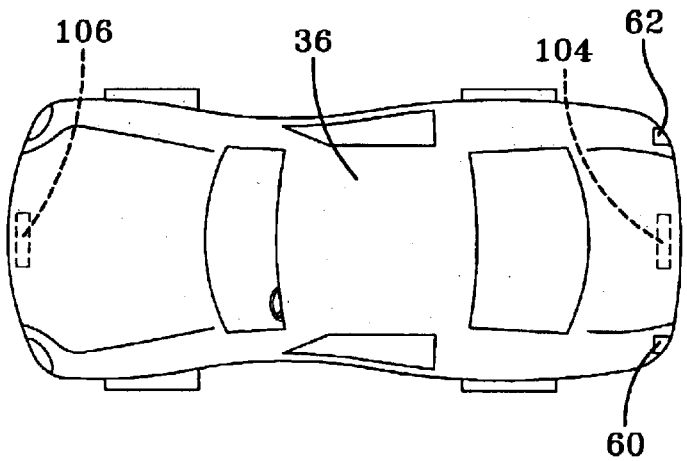
FIG. 9 is a top diagrammatic view of another embodiment of a motor vehicle.

FIG. 12 is a block diagrammatic schematic illustrating the system discussed in reference to FIGS. 9–11.

While the present invention has been described in an illustrative manner, it should be understood that the terminology used is intended to be in a nature of words of description rather than of limitation. Accordingly, various changes and modifications may be made to the illustrative embodiment without departing from the spirit or scope of the invention. It is to be appreciated that those skilled in the art will readily apply these teachings to other possible variations of the inventions. However, it is intended that the scope of the invention not be limited in any way to the illustrative embodiments shown and described.

What is claimed is:

1. A solid-state accelerometer warning module for motor vehicles having a power supply with a light illumination voltage level, said module having, at least one accelerometer responding to the variable speed of the motor vehicle, a microprocessor having a memory for storing an algorithm controlling the operation of said microprocessor and a calculation means responsive the algorithm for generating a first variable frequency illumination level control signal representing the deceleration rate of the motor vehicle, wherein the improvement comprises:

a first antenna mounted to the front of the motor vehicle;

a receiver electrically connected between said antenna and the module, said first antenna responsive for receiving a pulse rate control signal from another motor vehicle and inputting said received signal into said microprocessor;

a transmitter electrically connected to said microprocessor for transmitting said first variable frequency illumination voltage level control signal; and a second antenna mounted to the rear end of the motor vehicle for transmitting said voltage level control signal from the motor vehicle wherein said antennas are optical sensors and transmitters.

2. A brake light device having a plurality of concentric hollow cylindrical bodies forming an integral structure:

a first hollow cylindrical structure enclosed at one end and adapted to be inserted into the bulb socket in the brake system of a motor vehicle;

a second hollow cylindrical structure having one end connected to the other end of said first cylindrical structure, said second cylindrical structure having a solid-state accelerometer module mounted therein having, at least one accelerometer responding to the variable speed of the motor vehicle, a microprocessor having a memory for storing an algorithm controlling the operation of said microprocessor and a calculation means responsive the algorithm for generating a first variable frequency illumination voltage level control signal representing the deceleration rate of the motor vehicle; and a third hollow enclosed cylindrical structure connected to the other end of said second cylindrical structure having at least two lamp filaments mounted coaxially therein, at least one of said filaments electrically connected for varying the intensity and frequency of said filament according to said first variable frequency illumination voltage level control signal and said other filament electrically connected to receive said control signal having a magnitude equal to the illumination voltage level of the power supply.

3. A brake light device according to claim 2 additionally including one or more rings of LEDs mounted on said second cylindrical body and surrounding said third hollow cylindrical body, said LEDs being electrically connected for varying the intensity of said LEDs according to said first variable frequency illumination voltage level control signal, and at least one lamp filament coaxially mounted within said third hollow cylindrical body responsive to said control signal.

4. A brake light device according to claim 3 wherein said third hollow cylindrical body has a plurality of LEDs mounted within said hollow body and responsive to said control voltage.

5. A brake light device according to claim 2 wherein at least said third cylindrical structure is transparent.

* * * * *